(12) United States Patent
Mikuszewski et al.

(10) Patent No.: US 8,661,233 B2
(45) Date of Patent: Feb. 25, 2014

(54) SYSTEM CONFIGURATION

(75) Inventors: Andrew Mikuszewski, Houston, TX (US); Gregory P Ziarnik, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 259 days.

(21) Appl. No.: 13/075,349

(22) Filed: Mar. 30, 2011

(65) Prior Publication Data

US 2012/0254598 A1 Oct. 4, 2012

(51) Int. Cl.
*G06F 9/00* (2006.01)
*G06F 13/14* (2006.01)

(52) U.S. Cl.
USPC ............................ 713/1; 713/2; 710/305

(58) Field of Classification Search
USPC .................................. 713/1, 2, 300
See application file for complete search history.

(56) References Cited

U.S. PATENT DOCUMENTS

| | | | |
|---|---|---|---|
| 5,668,419 A * | 9/1997 | Oktay | 307/126 |
| 5,862,351 A | 1/1999 | He | |
| 6,145,019 A * | 11/2000 | Firooz et al. | 710/8 |
| 6,463,537 B1 | 10/2002 | Tello | |
| 6,625,742 B1 * | 9/2003 | Owhadi et al. | 713/340 |
| 7,353,474 B1 * | 4/2008 | Donlin | 716/121 |
| 7,639,486 B2 | 12/2009 | Champion et al. | |
| 2004/0088534 A1* | 5/2004 | Smith et al. | 713/1 |
| 2008/0052505 A1* | 2/2008 | Theobald | 713/1 |
| 2009/0144535 A1* | 6/2009 | Lin et al. | 713/2 |
| 2010/0100720 A1* | 4/2010 | Wu et al. | 713/2 |
| 2011/0126005 A1* | 5/2011 | Carpenter et al. | 713/158 |
| 2011/0208889 A1* | 8/2011 | Rijken et al. | 710/305 |
| 2012/0030455 A1* | 2/2012 | McLaughlin et al. | 713/2 |
| 2012/0124361 A1* | 5/2012 | Mulcahy et al. | 713/2 |

FOREIGN PATENT DOCUMENTS

WO     WO 2010050969 A1 *  5/2010  ............. G06F 13/38

* cited by examiner

*Primary Examiner* — Kim Huynh
*Assistant Examiner* — Vincent Chang
(74) *Attorney, Agent, or Firm* — Robert McDowell

(57) ABSTRACT

Embodiments provide methods, systems, and articles of manufacture for determining a configuration for system board based on a connector. The connector may have a structure that enables a system board to determine configuration data associated with a system configuration.

17 Claims, 3 Drawing Sheets

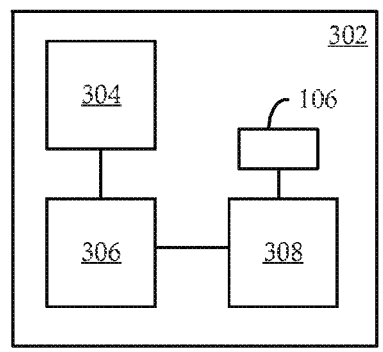
Figure 3
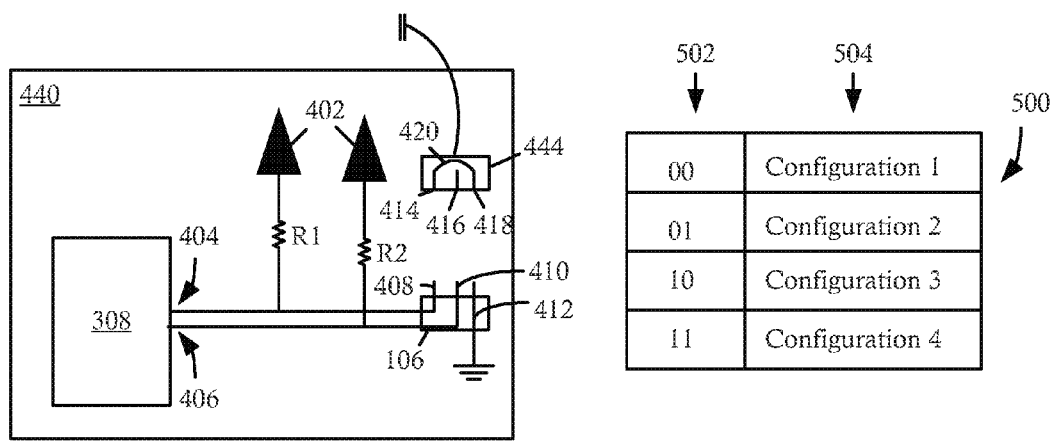
Figure 4
Figure 5

SYSTEM CONFIGURATION

BACKGROUND

Computing systems may include components, for example motherboards, that are capable of a plurality of functions and connections with various peripherals. These functions and connections may be associated with different configurations. Different system configurations may be used for marketing purposes, to overcome regulatory issues, or to set varying price points for the system. As an example, a motherboard of a computing system may have a configuration that disables a function. Because a function has been disabled, the computing system may be offered at a reduced price relative to computing systems with the function enabled or sold in regions where the disabled function violates local laws or regulations.

BRIEF DESCRIPTION OF THE DRAWINGS

FIG. 3 illustrates a block diagram of a system in accordance with an embodiment;

FIG. 4 illustrates a diagram of a system in accordance with embodiment;

FIG. 5 illustrates a table in accordance with an embodiment; and

DETAILED DESCRIPTION

Computing systems may include configuration data that enables or disables functionality. For example, a system board of a computing system may include configuration data that enables or disables security functions, network download functions, platform modules, connections to various peripherals, and/or other tools. In other words, the configuration data may enable a generic system to have multiple configurations. While multiple configurations may be useful for marketing and regulatory reasons, among others, they typically lead to increased costs. These increased costs may be attributed, in part, to an inventory of configured system boards that is maintained for each system configuration.

In the present disclosure, methods, systems, and articles of manufacture are disclosed that enable a system board to determine and store configuration data upon placement of the system board into the computing system. This may negate the need to maintain an inventory of system boards for each configuration. Configuration data may be any data that enables or disables functionality associated with a system configuration.

Figure 1:
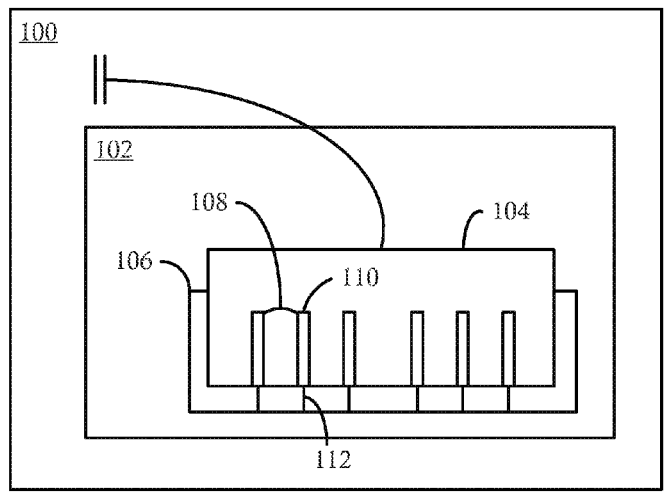
FIG. 1 illustrates a diagram of a system in accordance with an embodiment.

Referring to FIG. 1, a system 100 is illustrated in accordance with an embodiment. The system 100 includes a system board 102 having socket 106 with pins 112, and a connector 104 with contacts 110. The system 100 may be a computing system such as, but not limited to, a notebook computer, a desktop computer, a netbook computer, a slate or tablet computing system, or any other computing device capable of multiple configurations.

A system board 102 may be any configurable board within a computing system that provides connections to peripherals or computing device components. One example of a system board is a motherboard, others are contemplated. In the illustrated embodiment, the system board 102 operates in accordance with multiple configurations. For example, the system board 102 can operate in accordance with a first configuration or a second configuration.

In the first configuration, the system board 102 may enable functionality that is disabled in the second configuration. Alternatively, the system board 102 may enable functionality in the second configuration that is disabled in the first configuration. Other embodiments are contemplated, for example, the functionality between different configurations may not be mutually exclusive. Examples of functionality that may be enabled or disabled includes security protocols, network download functionality, trusted platform modules, network download tools, management technology, access to additional boards, access to hardware components, or access to other software tools associated with the corresponding computing system.

A connector 104 may be coupled to the system board 102 via a corresponding socket 106. The connector 104 and socket 106, when coupled, form an electrical connection between contacts 110 and pins 112. A connector 104 may be any component configured to electrically couple another component to a corresponding socket. Such connectors may include headers, for example, a power button header. The connector 104 includes a configuration or structure that enables the system board 102 to identify and select either the first configuration or the second configuration for the system board 102. The structure of the connector comprises the configuration or arrangement of contacts 110 and links 108 between the various contacts 110 of the connector 104.

As an example, the connector 104 may include contacts 110 that are configured to form electrical connections with corresponding pins 112 of socket 106. The connector 104 may also include a link 108, such as a loopback. A link or loopback may be defined as an electrical connection between two or more contacts 110. The configuration of the various contacts 110 and links 108, may enable the system board 102 identify and store configuration data associated with either the first configuration or the second configuration. Because connectors 104 generally remain with the system 100 during replacement of a system board 102, they may be utilized to retain information about the system board 102 or the system 100. Consequently, upon introduction of a new or replacement system board 102, the connector 104 may convey the appropriate configuration data to the new or replacement system board 102.

The socket 106 may have pins 112 to form electrical connections with corresponding contacts 110 of connector 104. The socket 106 may include any number of pins 112 to enable connections to various components on the system board 102. While the socket 106 is illustrated with six pins, more or fewer pins may be utilized without deviating from the scope of the disclosure.

Figure 2:
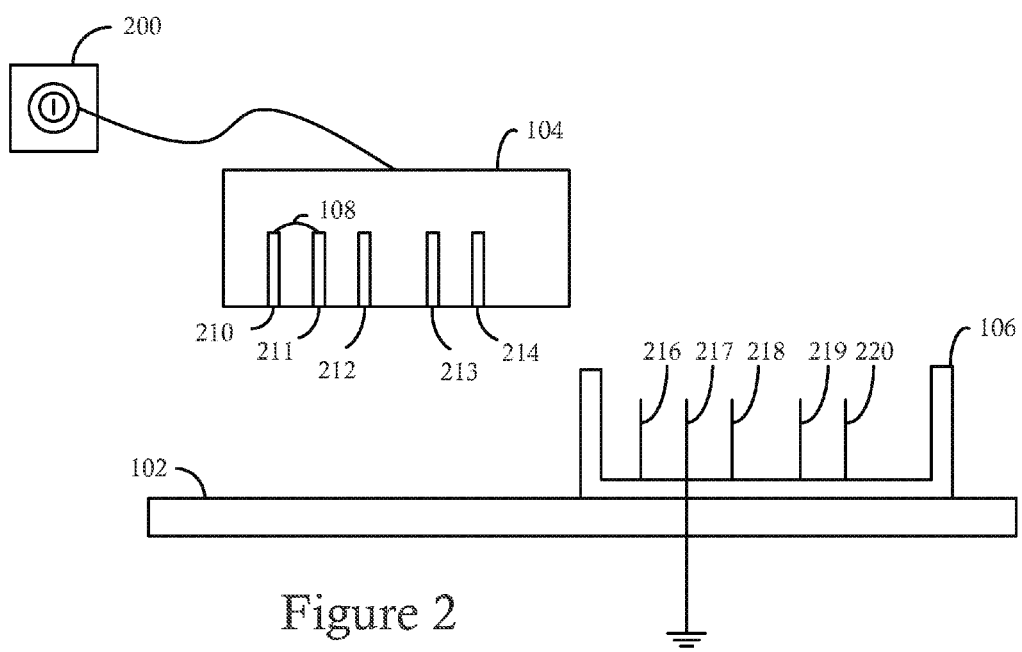
FIG. 2 illustrates a diagram of a system in accordance with an embodiment.

Referring to FIG. 2, another example of a system is illustrated. The system of FIG. 2 includes connector 104 coupled to a power button 200. The connector 104 includes contacts 210-214 and a link 108. FIG. 2 also illustrates a system board 102 having a socket 106. The socket 106 includes a plurality of pins 216-220.

Similar to FIG. 1, the system board 102 may be configured to operate in accordance with a first configuration or a second configuration. For example, in a first configuration the system board 102 may enable access to various platform modules and security functionality. In a second configuration, the system board 102 may prevent access to the various platform modules and security functionality. To identify and store configuration data associated with either the first configuration or the second configuration, the system board 102 may monitor various connections between the connector 104 and the socket 106.

The socket 106 includes pins 216-220 that couple to the contacts 210-214 of connector 104. In the example, pin 220 is a power pin that forms an electrical connection with contact 214. The power pin 220 enables the system board to determine when power button 200 has been actuated. Pin 219 is a light emitting diode (LED) pin that forms an electrical connection with contact 213. The LED pin 219 enables the system board 102 to activate an LED to indicate a power state of the system. Pin 217 is a ground pin coupled to the one of multiple grounds, for example, chassis ground. Pins 216 and 218 are pins that form electrical connections with contacts 210 and 212, respectively. Pins 216 and 218 enable the system board 102 to identify configuration data for the system board 102.

Pins 216 and 218 enable the system board 102 to identify configuration data based on a structure of connector 104. For example, dependent upon a structure of connector 104, pins 216 and 218 will be coupled to a ground voltage or left floating. In FIG. 2, connector 104 includes a link 108 between contact 210 and 211. Consequently, when connector 104 is coupled to socket 106, link 108 will form an electrical connection between pin 217 and 216, effectively grounding pin 216. Pin 218 is left floating because the connector 104 does not include a corresponding link between contact 211 and 212. Based on the ground voltage and the floating voltages of pins 216 and 218, the system board may identify configuration data for the system board 102.

Referring to FIG. 3, a block diagram of a system board 302 is illustrated in accordance with an embodiment. The system board 302 includes a socket 106, a computing device 308, a basic input/output operating system (BIOS) 306, and a memory 304. The system board 302 may include other elements without deviating from the disclosure.

The system board 302 includes a computing device 308. The computing device 308 may be a central processing unit, a general purpose processor, an application specific integrated circuit (ASIC), or another computing device, for example an input/output control hub (ICH). The computing device 308 may include a general purpose input/output (GPIO) pin or a designated pin that enables the system board to identify a structure of a connector. A GPIO pin may be a generic pin on a component that may be controlled or programmed for various purposes. Based on the structure of the connector (e.g., contacts and links), the system board 302 can identify and store configuration data.

BIOS 306 may be embodied on an integrated circuit such as a flash device. The BIOS is configured to load and start an operating system associated with the system board 302. The BIOS 302 may be further configured to monitor the pin or pins of the computing device 308 to identify configuration data for the system board 302. For example, the BIOS 306 may monitor the GPIO pin of computing device 308 to determine a structure of the connector. Based on the structure, the BIOS may identify configuration data to be stored in memory 304. Monitoring the GPIO pin of computing device 308 may comprise monitoring a voltage level on the GPIO pin.

In another embodiment, BIOS 306 may be configured to determine whether configuration data for the system board 302 is stored within a memory prior to monitoring various pins of the computing device 308. This determination may prevent repetitive attempts to save configuration data. Additionally, it may enable an amount of security as subsequent modifications to the connector may not be able to enable or disable various functions.

Memory 304 may be coupled to BIOS 306. Memory 304 may store configuration data accessible by the system board 302. Memory 304 may be a computer readable medium, and in addition to configuration data, may include a plurality of programming instructions that, when executed, enable various components to perform various actions as described herein. Memory 304 may include configuration data associated with either a first configuration or a second configuration. With configuration data stored within memory 304, BIOS 306 may enable or disable various functions during a boot sequence.

Socket 106 may be a connection point for a peripheral, a power button, or other component managed by the system board 302. Socket 106 includes a pin coupled to the GPIO pin of computing device 308 and further configured to couple with a connector (not illustrated). The socket 106 may include any number of pins or contacts.

Referring to FIG. 4, an example system diagram is illustrated. FIG. 4 includes a system board 440, a computing device 308 having GPIO pins 404 and 406, a power rail 402, resistors R1 and R2, and a socket 106 to electrically couple to connector 444.

Connector 444 is configured to couple to socket 106 and includes a configuration determining structure. The structure of connector 106 includes link 420, and contacts 414, 416, and 418. Contacts 414 and 416 are configured to form electrical connections with pins 408 and 410, respectively. Contact 418 is configured to couple to with ground pin 412. Additionally, contact 418 is electrically coupled to pin 414 via link 420. Therefore, when connector 444 is coupled to socket 106, pin 408 will be coupled to ground pin 412. This will effectively couple the GPIO pin 404 to ground. A BIOS reading the GPIO pins 404 and 406 will read, respectively, a ground voltage and a power rail voltage.

The BIOS may utilize these two voltages as an identifier to determine an appropriate configuration for the system board 440. In one embodiment, the BIOS may use a look up table, for example, table 500 illustrated in FIG. 5. The BIOS may use the voltages read from the GPIO pins 404, 406 as an identifier 502 to determine an appropriate configuration for the system. In the illustrated example, GPIO pin 404 is determined as a 0 or low voltage, while GPIO pin 406 is determined as a 1 or high voltage. Using table 500, the system board 440 may identify configuration data associated with configuration 2 and store that information in memory accessible by the system board. More of fewer GPIO pins may be utilized to differentiate between more or fewer configurations.

Figure 6:
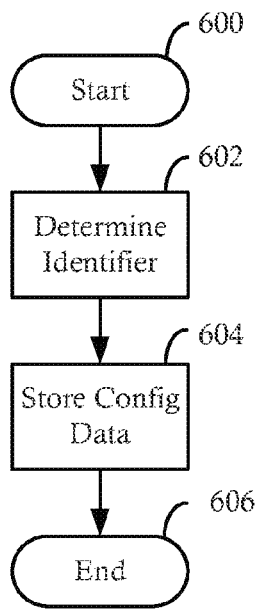
FIGS. 6-8 illustrate flow diagrams in accordance with various embodiments.
Figure 7:
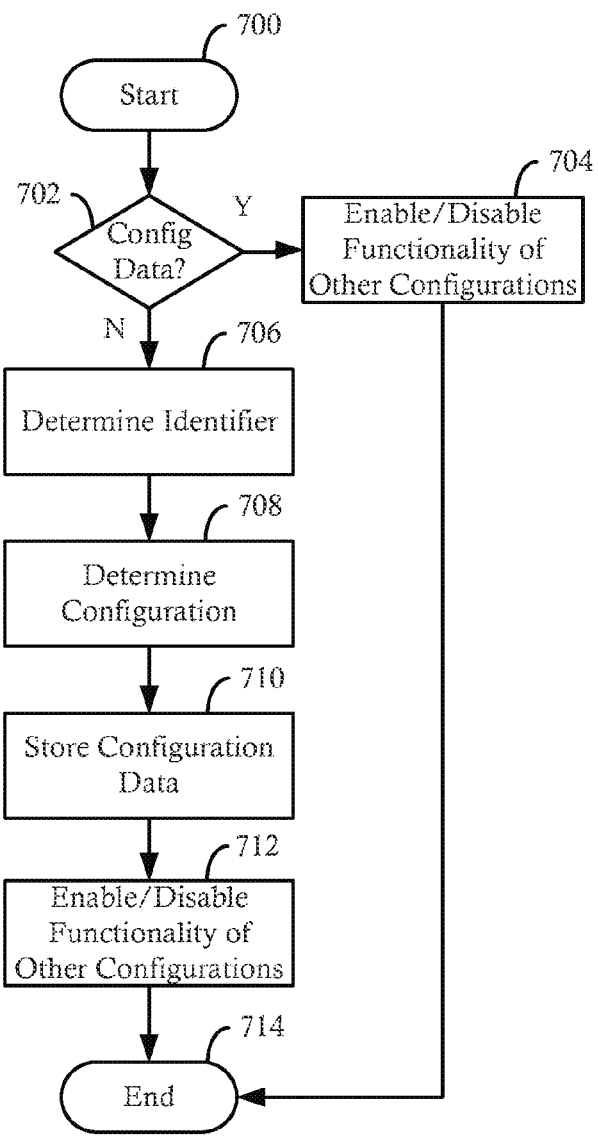
Figure 8:
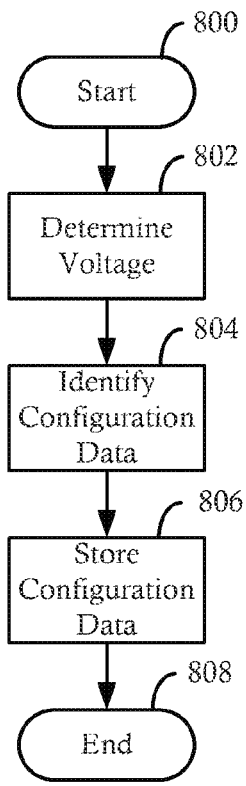

Referring to FIG. 6-8 flow diagrams are illustrated in accordance with various embodiments. The flow diagrams may describe methods that may be implemented as machine readable instructions stored on a computer readable medium.

In FIG. 6, the method begins at 600 and progresses to 602, where an identifier may be determined. In one example, the identifier is determined based on a structure of the connector. The identifier may be associated with one of a plurality of system configurations. Based on the determined identifier, the method may continue to 604 where the system board stores configuration data associated with the determined system configuration in a memory that is accessible by the system board. The configuration data is configured to enable functionality associated with the system configuration.

After storing the configuration data within the memory accessible by the system board, the method may end at 606. Ending the method at 606 may comprise booting the system from memory and enabling or disabling various configurations based on the configuration data.

Referring now to FIG. 7 another flow diagram is illustrated. The method may begin at 700 and progress to 702 where a system board, via a BIOS, may determine whether configuration data is present within a memory accessible by the system board. Determining whether configuration data is accessible may enable the system board to determine whether the appropriate functionality has been previously enabled or disabled.

If configuration data is present within the memory accessible to the system board, the method may continue to 704, where functionality may be enabled or disabled in accordance with the accessible configuration data. Subsequently, the method may end at 714. Ending may comprise booting the system with the appropriate functionality enabled or disabled.

If configuration data is not present within the memory accessible to the system board, the method may continue to 706 where the system board may determine an identifier that corresponds to a system configuration based on a structure of the connector. Determining the identifier in various embodiments may comprise reading GPIO pins coupled to the connector, determining the identifier based on a power button connector, or determining whether a plurality of GPIO pins are coupled to a ground voltage.

The system board may determine corresponding configuration data at 708 based on the determined identifier. To determine the corresponding configuration data the system board may use a look up table that is predefined for various configurations. For example, the computing system may use a table as described with reference to FIG. 5. At 710, the computing system may store the configuration data in a memory accessible to the system board.

Once the configuration data is stored within memory accessible to the system board, the system may operate in accordance with a configuration that corresponds to the configuration data. The configuration may prevent or enable various functions, and the method may end at 714. Ending may comprise booting the system with the appropriate functionality enabled or disabled.

Referring to FIG. 8, another flow diagram is illustrated in accordance with an embodiment. The method may begin at 800 and progress to 802, where a system board may determine a voltage on a pin. Determining the voltage may include determining whether the pin is coupled to a voltage rail, for example a 3.3 Volt rail, or alternatively, whether the pin is coupled to a ground voltage, such as chassis ground or earth ground.

With the voltage determined, the system may identify configuration data at 804. The configuration data may correspond to one of a plurality of configurations. At 806, the system may store the configuration data within a memory accessible by the system board. The method may end at 808.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope of this disclosure. Those with skill in the art will readily appreciate that embodiments may be implemented in a wide variety of ways. This application is intended to cover any adaptations or variations of the embodiments discussed herein. Therefore, it is manifestly intended that embodiments be limited only by the claims and the equivalents thereof.

What is claimed is:

1. A system comprising:
   a system board capable of operation in accordance with a first configuration or a second configuration;
   a memory storing a first configuration data to enable operation in accordance with the first configuration and a second configuration data to enable operation in accordance with the second configuration;
   a connector coupled to the system board, wherein a structure of the connector identifies either the first configuration or the second configuration for the system board; and
   a basic input/output system (BIOS) on the system board that prevents the use of the first configuration data when the structure of the connector identifies the second configuration, and prevents to use of the second configuration data when the structure of the connector identifies the first configuration.

2. The system of claim 1, wherein the connector is a power button connector.

3. The system of claim 1, wherein the configuration of the connector includes a link that couples a contact of the connector to a ground voltage.

4. The system of claim 1, wherein the BIOS is to store configuration data associated with the identified first configuration or second configuration based on a determination that configuration data is not stored in the memory.

5. The system of claim 1, wherein the connector is to couple a general purpose input/output (GPIO) pin to a ground voltage to identify the first configuration.

6. The system of claim 1, wherein the first configuration enables functionality that is prevented by the second configuration.

7. A method, comprising:
   determining an identifier that corresponds to a system configuration based on a structure of a connector, wherein the connector is to couple to a system board operable in accordance with a plurality of system configurations;
   storing configuration data associated with the system configuration in a memory accessible by the system board, the configuration being a first configuration data when the identifier corresponds to a first structure and a second configuration data when the identifier corresponds to a second structure, wherein the configuration data enables functionality associated with the system configuration; and
   preventing, by a basic input/output system (BIOS) on the system board, storage of the first configuration data when the identifier corresponds to the first structure and storage of the second configuration data when the identifier corresponds to the second structure.

8. The method of claim 7, further comprising:
   disabling functionality associated with a system configuration of the plurality of system configurations based on the configuration data.

9. The method of claim 7, wherein determining the identifier comprises reading general purpose input/output (GPIO) pins coupled to the connector.

10. The method of claim 7, wherein storing the configuration data in a memory accessible by the system board comprises storing the configuration data into the BIOS.

11. The method of claim 7, further comprising:
    determining whether the BIOS includes other configuration data prior to determining the identifier.

12. The method of claim 7, wherein determining the identifier that corresponds to the system configuration comprises determining the identifier based on a power button connector.

13. The method of claim 7, wherein determining the identifier comprises determining whether a plurality of general purpose input/output (GPIO) pins are coupled to a ground voltage.

14. An article of manufacture comprising a non-transitory computer readable medium having a plurality of programming instructions stored thereon, wherein the plurality of programming instructions, if executed, cause a system board to:
  determine a voltage on a general purpose input/output (GPIO) pin, wherein the voltage is modifiable by a connector configured to determine a system configuration;
  identify configuration data based on the determined voltage, wherein the configuration data is a first configuration data based on a first determined voltage and a second configuration data based on a second determined voltage;
  store the configuration data in a memory accessible by the system board to enable functionality associated with the configuration data; and
  cause a basic input/output system (BIOS) on the system board to prevent use of the first configuration data when the determined voltage is a first determined voltage and use of the second configuration data when the determined voltage is a second determined voltage.

15. The article of manufacture of claim 14, wherein the plurality of programming instructions, if executed, cause the system board to:
  determine whether configuration data associated with another system configuration is stored in the memory accessible by the system board.

16. The article of manufacture of claim 14, wherein the plurality of programming instructions, if executed, cause the system board to:
  prevent functionality associated with another system configuration based on the configuration data.

17. The article of manufacture of claim 14, wherein the voltage is varied by a power button connector configured to identify the system configuration.

* * * * *